United States Patent
Stokes et al.

(10) Patent No.: US 10,525,505 B2
(45) Date of Patent: *Jan. 7, 2020

(54) PROCESS FOR MAKING A CONTAINER WITH A RESVERATROL LAYER

(71) Applicant: Intelligent Packaging Pty Limited, Victoria (AU)

(72) Inventors: Gregory John Charles Stokes, Victoria (AU); Steven John Anthony Barics, Victoria (AU)

(73) Assignee: INTELLIGENT PACKAGING PTY LIMITED, Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,602

(22) Filed: Dec. 28, 2018

(65) Prior Publication Data

US 2019/0134666 A1 May 9, 2019

Related U.S. Application Data

(60) Continuation-in-part of application No. 15/940,256, filed on Mar. 29, 2018, now Pat. No. 10,207,291, which is a continuation-in-part of application No. 15/355,312, filed on Nov. 18, 2016, now Pat. No. 9,962,734, which is a division of application No. 14/428,452, filed as application No. PCT/AU2014/000671 on Jun. 26, 2014, now Pat. No. 9,776,768.

(30) Foreign Application Priority Data

Jun. 26, 2013 (EP) .................................... 13173820

(51) Int. Cl.
| | | |
|---|---|---|
| *B05D 7/22* | (2006.01) |
| *B65D 25/14* | (2006.01) |
| *B65D 81/28* | (2006.01) |
| *B05D 5/00* | (2006.01) |
| *A47G 19/22* | (2006.01) |
| *C12H 1/22* | (2006.01) |
| *C12H 1/14* | (2006.01) |
| *B32B 15/20* | (2006.01) |
| *B32B 15/04* | (2006.01) |
| *B05D 1/02* | (2006.01) |
| *B05D 7/26* | (2006.01) |
| *B05D 3/02* | (2006.01) |
| *B32B 27/08* | (2006.01) |
| *B65D 81/24* | (2006.01) |
| *B05D 7/14* | (2006.01) |
| *B05D 1/36* | (2006.01) |
| *B05D 7/16* | (2006.01) |

(52) U.S. Cl.
CPC ......... *B05D 7/227* (2013.01); *A47G 19/2205* (2013.01); *B05D 1/02* (2013.01); *B05D 1/36* (2013.01); *B05D 3/0254* (2013.01); *B05D 5/00* (2013.01); *B05D 7/14* (2013.01); *B05D 7/16* (2013.01); *B05D 7/26* (2013.01); *B32B 15/04* (2013.01); *B32B 15/20* (2013.01); *B32B 27/08* (2013.01); *B65D 25/14* (2013.01); *B65D 81/24* (2013.01); *B65D 81/28* (2013.01); *C12H 1/14* (2013.01); *C12H 1/22* (2013.01); *B32B 2439/00* (2013.01)

(58) Field of Classification Search
CPC ........ B65D 25/14; B65D 81/24; B65D 81/28; B32B 27/08; B32B 81/28; B05D 1/36; B05D 3/0254; B05D 5/00; B05D 7/14; B05D 7/16; B05D 7/227; B05D 7/26; C12H 1/00
USPC ........... 206/524.3; 426/131, 321, 323, 330.4, 426/392, 397; 427/230–239, 372.2, 427/327.4, 427.5, 384, 388.1, 409
See application file for complete search history.

(56) References Cited

U.S. PATENT DOCUMENTS

2012/0184682 A1* 7/2012 Dasgupta .............. C07C 43/215
525/277

* cited by examiner

*Primary Examiner* — William P Fletcher, III
(74) *Attorney, Agent, or Firm* — Scott R. Cox

(57) ABSTRACT

A process for preparing a container for a liquid, wherein the process includes applying a coating layer, which includes a polymeric coating and a monomeric resveratrol additive, to an inner layer of a container wall.

20 Claims, 3 Drawing Sheets

PROCESS FOR MAKING A CONTAINER WITH A RESVERATROL LAYER

CROSS REFERENCE TO RELATED APPLICATIONS

This application is a continuation-in-part application based on application Ser. No. 15/940,256, filed on Mar. 29, 2018 (Now U.S. Pat. No. 10,207,291), which is a continuation-in-part application based on application Ser. No. 15/355,312, filed on Nov. 18, 2016 (Now U.S. Pat. No. 9,962,734), which is a divisional based on application Ser. No. 14/428,452, filed on Mar. 16, 2015 (Now U.S. Pat. No. 9,776,768), which was filed as a 371 U.S. national stage of International Application No. PCT/AU2014/000671, filed 26 Jun. 2014, and claims priority to European Patent Application No. 13 173 820.5, filed 26 Jun. 2013. The entire contents of the above-applications are incorporated herein by reference.

TECHNICAL FIELD

The present invention relates to a container for a liquid, such as beverages, having an inner coating layer comprising resveratrol, a process for preparing such a container, the use of said container for the storage of liquids and the use of resveratrol as an additive to coating layers of such containers.

BACKGROUND OF THE INVENTION

Liquids, including beverages such as wine and wine products, have been stored in various containers over the centuries, including timber, animal skins, pottery and leather. The use of glass bottles has evolved more recently as the preferred storage method; however glass has a number of drawbacks as a packaging medium for liquids, including its weight, durability and less than optimum recycling ability. The disadvantages of glass packaging have been further enhanced due to increasing demand of retailers from suppliers to commit to minimising the carbon footprint (Green miles and Water miles coefficients) associated with the supply of goods.

Alternative packaging forms for wine, beverages, and other liquids, such as metal cans, polyethylenetetraphthate (PET) bottles and Tetra Pak cartons have increased in popularity in the past decade. These offer advantages of lower weight. However for some wine their success has been limited and so far none of these has been successfully used as packaging medium for the storage of wine. This lack of success is primarily due to the relatively aggressive nature of wine, non-specific filling practices and non-specific lacquer specifications which are the cause of adverse wine integrity effects as a result of the interaction between the product and container.

The development of a robust packaging system for delicate liquid products, such as wine and wine based products, is considered desirable so as to ensure product integrity, longevity and to meet consumer demands for sustainable packaging and the requirements of maintaining the wines integrity (key notes of sight, nose and taste) under various global storage and transport conditions.

Over the past decade the global storage and transport of products such as wine has needed to become more environmentally sustainable and has become a key commercial consideration driven by consumer demand for environmentally friendly products and packaging which limit their impact on the environment and do not allow the integrity of the wine inside the container to suffer deterioration during its storage and transport.

Wine conveyed in more traditional wine containers suffer detrimental impacts to the wines integral notes due to these negative logistics, weather, storage etc. conditions without the assistance of refrigeration.

Liquid products, such as wine, that are extremely and continuously interactive with their environment, require their internal chemical balance to be maintained in order for the products integrity to be delivered intact to the consumer as the winemaker had intended. With the global markets opening winemakers wish to deliver their products to the consumer globally the way they had made the wine. This is extremely difficult in a global market with its varying weather conditions, temperature fluctuations, quality and ability of logistics systems to maintain the wines' integrity until it reaches the consumer.

In addition, the need for an integrated wine packaging system and a product that delivers an exact equilibrium for global transport allowing the delivery of a wine that maintains its integral balance and profile from the winemaker to the consumer no matter where that consumer is located with a stable shelf (up to and well over 12 months) has been a long felt commercial requirement but is also environmentally friendly to minimise its overall carbon footprint.

As the world market demand for wine increases, there is a need to transport wine that maintains its integrity and safety globally with the additional use of a more environmentally sustainable packaging. The need for the development of an integrated wine and liquid packaging system with a closed loop fully recyclable product capability of carrying a diverse product range globally through a variety of storage and transport conditions has emerged.

To meet the expectations of an increasingly environmentally aware consumer coupled with the desire for product integrity, aluminium containers without the risk of can taint are required in order for the consumer to confidently transition to this form of environmentally friendly packaging for a high value product, such as wine, over other less environmentally friendly packaging currently available.

Consumer assurance is reliant on factors such as the non 'tinny' taste (can taint) of products packaged in aluminium containers, shelf life stability and product integrity which need to be maintained by products packaged in aluminium containers.

Traditionally can manufacturers use lacquers to coat the inside of aluminium cans to form a barrier between the product and can body prior to being filled. These traditional lacquers are applied to the inside of a can for the purpose of holding a liquid, such as a beverage, in aluminium container for a short period of between 3-6 months.

The current general process used by liquid can/container manufacturers to construct and apply a lacquer does not address the issue of wine and wine products shelf life stability and product integrity. Many manufacturers of cans for liquids or other containers are faced with product integrity deterioration, some of which include flavour profile degradation, loss of freshness, changes to the taste, aroma and colour of the products and can coating failures leading to pin holing and spoilage. Finally internal product collapse may occur, further damaging the reputation of the aluminium container as a premium container and environmental alternative.

It is generally recognised in the industry that wine and wine products are known to suffer product breakdown— with loss of product integrity, over a short period of time (6 months) when filled in cans/can bottles etc. using current regular lacquers. Liquid can manufacturers own internal guidelines recommend only 6 months as a stable shelf life and after that it is guess work based on the individual product by product time test evaluation.

Aluminium liquid container manufacturers receive significant consumer complaints that canned liquids taste "tinny", "oxidised" or "off", "lacking in flavour" or "dull tasting". This is because the product itself has suffered loss of integrity via the interaction of the product with the coating and aluminium container through the breakdown of the coating or even to some extent the lacquer. This leads to the consumer perception that products produced in aluminium containers are inferior, particularly for high value products such as wine when the consumer compares the same wine that is in glass packaging.

The perceived taste difference causes a negative view of the aluminium containers potential to deliver wine and wine based products with integrity and consistent quality. This has a knock on effect as glass is not as recyclable as aluminium and therefore has a greater negative impact on the environment.

In today's competitive market, manufacturers look at ways of reducing costs and staying competitive in the marketplace. Liquid manufactures demand lower priced packaging options from their suppliers, forcing can manufacturers to use the least amount of aluminium and lacquer to deliver a competitive product to their customers.

Since the mid-nineties there has been a significant shift towards the use of thinner gauged aluminium for the manufacture of aluminium cans. Aluminium container manufacturers look at various ways to reduce the cost of aluminium liquid containers and one way of achieving this is to reduce the aluminium gauge of the aluminium rolls used to manufacture the cans.

This move to thinner gauged aluminium reduces overall costs while also decreasing the amount of metal and energy required to produce a can. However, the thinner can presents a number of significant issues to the products they carry which are of great concern to can and liquid manufacturers and the consumer. It is more susceptible to exterior damage and also to lacquer damage during the manufacturing, filling, packing, storage, transport and throughout the entire supply chain process.

Handling of the product may result in damage via dents and depending on the position of these on the can, damage (cracking and fracturing) may also result to the internal can lacquer and subsequently expose the product to the raw aluminium resulting in product contamination and spoilage. Such damage has the potential of destroying the entire shipment of the products through the leaking aluminium container infecting the surrounding products and causing significant financial losses.

Additionally, given today's global economy, liquid producers are forced to package their products in a number of countries around the world. These products become susceptible to a variety of local conditions at time of manufacture, including water quality and chemical content, weather conditions etc., all of which have significant potential to impact on product integrity, stability and longevity.

Therefore, it is an object of the present invention to provide an advantageous container for a liquid, such as a beverage, in particular for an aggressive and hard to hold beverage such as wine or a wine-based product, which provides an increased shelf life without a negative influence on product integrity or taste.

Furthermore, it is another object of the present invention to provide a process for preparing such a container.

SUMMARY OF THE INVENTION

According to one aspect of this invention, a container (1) for a liquid, such as a beverage, in particular wine or a wine-based drink, is provided wherein the inner surface (2) of the container is at least partially coated with a coating layer (3) comprising resveratrol.

In a preferred embodiment, the container does not contain a liquid, in particular wine or a wine-based drink. Thus, one aspect of the invention refers to the container as produced before it is filled with the liquid, in particular wine or a wine-based drink.

In another preferred embodiment, the inner surface of the container is integrally coated with a coating layer comprising resveratrol.

In yet another preferred embodiment, the coating layer comprises resveratrol in a concentration of at least 0.0001 weight %, preferably at least 0.001 weight %, more preferably at least 0.01 weight %, even more preferably at least 0.1 weight %, even more preferably at least 1.0 weight %.

In yet another preferred embodiment, the coating layer comprises resveratrol in a concentration of at most 30 weight %, preferably at most 10 weight %, more preferably at most 1 weight %, even more preferably at most 0.1 weight %, even more preferably at most 0.01 weight %.

In yet another preferred embodiment, the container is made of glass, metal, polymer material, paper, cardboard, or combinations thereof, in a more preferred embodiment of aluminium.

In yet another preferred embodiment, the thickness of the coating layer on the inner surface of the container is in the range of between about 3.5 to about 8.4 grams per square meter, in a more preferred embodiment in the range of about 4.0 to about 8.0 grams per square meter, in a most preferred embodiment in the range of about 5.0 to about 8.0 grams per square meter.

In another preferred embodiment, the coating layer does not contain epoxy resins, in a more preferred embodiment the coating layer does not contain bisphenol A or bisphenol A-releasing substances.

In another preferred embodiment the coating layer may include multiple layers, each with the same or different compositions. Some or all of the layers may include various quantities of resveratrol.

In another preferred embodiment, the liquid contained in the container contains various quantities of resveratrol. The resveratrol present in the liquid may be present naturally, as occurs with wine, or various quantities of resveratrol may be added to the liquid.

In anther preferred embodiment, a portion of the resveratrol contained in the liquid within the container is absorbed by a coating layer or layers secured to an inner surface of the container.

DRAWINGS

Figure 6:
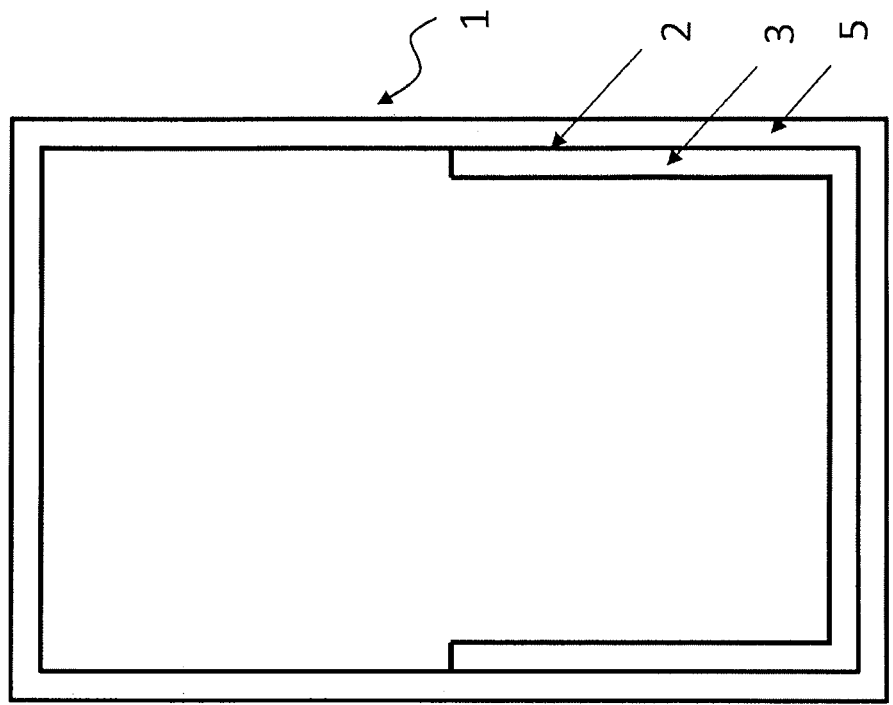
Figure 6:
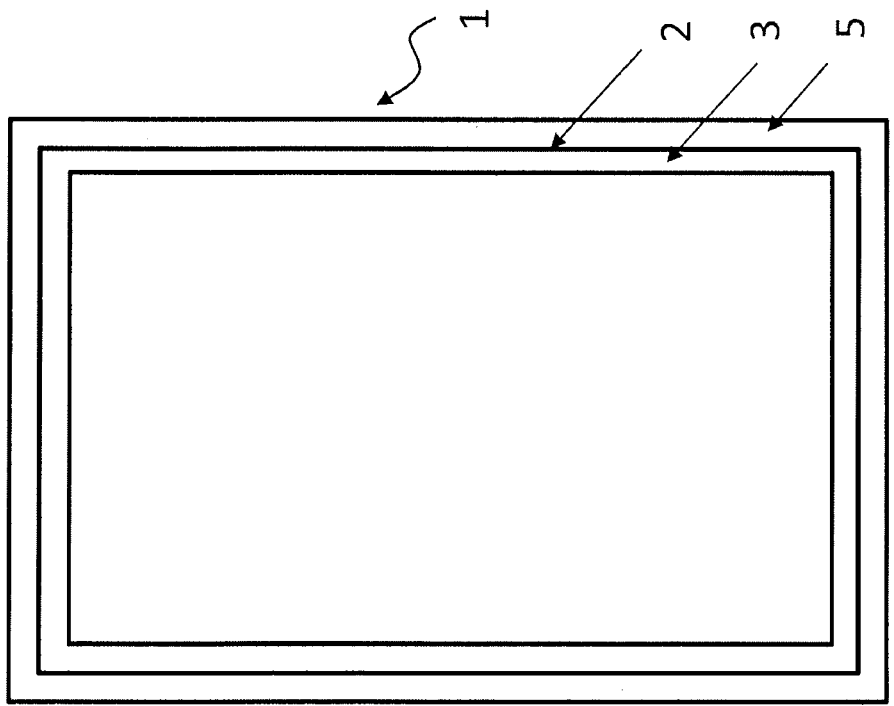

FIG. 6a) shows another embodiment of a container (1). An inner surface (2) of the container is a resveratrol containing layer (3) and is integrally coating the entire inner surface of the container.

FIG. 6b) shows a similar container to FIG. 6a) but the inner surface (2) of the container is only partially coated with a resveratrol containing layer (3).

In yet another embodiment, the coating layer is a thermoset or thermoplastic coating layer.

In yet another embodiment, at least one additional coating layer is present in the container.

According to another embodiment, a process for preparing a container for a liquid, such as wine or a wine-based drink comprises the steps of applying an uncured coating layer comprising resveratrol to a surface of a container wall material; and curing the uncured coating layer.

In another embodiment of the process, the uncured coating layer comprising resveratrol is applied to the surface of a container wall material before the container is formed.

In another embodiment of the process, the uncured coating layer comprising resveratrol is applied to the surface of a container wall material after the container is formed.

In another embodiment of the process, one or more additional coating layers, which may or may not contain resveratrol, are applied to the container either prior and/or after the resveratrol coating layer is applied.

In yet another embodiment, the process comprises the additional step of filling the container with a liquid, in particular a wine or a wine-based drink.

According to another embodiment, a container obtainable by the described process is provided.

According to another embodiment, the use of the container according to the various embodiments of the present invention for the storage of a liquid, in particular wine or a wine-based drink, is provided.

According to another embodiment, the use of resveratrol as an additive to a coating layer on the inner surface of a container for a liquid, in particular wine or a wine-based drink, is provided.

According to another embodiment, resveratrol is present in a liquid contained in the container and is absorbed by one or more coating layers on an inner surface of the container.

DETAILED DESCRIPTION OF THE INVENTION

Figure 2:
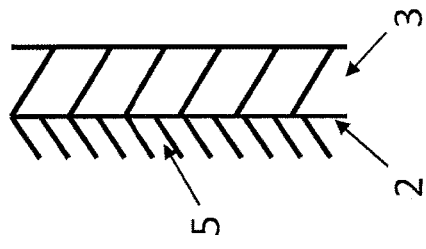
FIG. 2 shows a cut away view of an embodiment, wherein a portion of the container is the inner surface (2) of the container, which is coated with a coating layer comprising resveratrol (3). Also shown is the container wall (5) of the container.

It has been surprisingly found that a container for a liquid such as a beverage, such as wine, wherein the inner surface of the container is at least partially coated with a coating layer comprising resveratrol provides excellent protection from the detrimental and undesired loss of quality, including the undesired consequences of the reaction between the liquid and the packaging material. See FIG. 2.

Herein, wine is understood to comprise any beverage which is obtained from viticulture and wine-making techniques as they are known in the art. In one preferred embodiment, the wine is a red wine. In another preferred embodiment, the wine is a white wine. In yet another preferred embodiment, the wine is a rose wine. The wine may be a still wine or a carbonated, sparkling wine. The wine may also be a fortified wine. A wine-based drink is understood to comprise any beverage which comprises a wine as defined above. As examples for wine-based drinks, wines blended with mineral water or fruit juice may be mentioned.

In addition, a container with a coating comprising resveratrol surprisingly enhances and stimulates the defence mechanism against oxidation and yeast growth in the packaged wine. Resveratrol is also found in the skins of the grapes. Resveratrol is found in wine (grapes) in the cis—as well as in the trans-configuration. Herein, the term resveratrol should be understood in its broadest form. In one embodiment, resveratrol comprises cis-resveratrol as well as trans-resveratrol. In a preferred embodiment, resveratrol should mean trans-resveratrol.

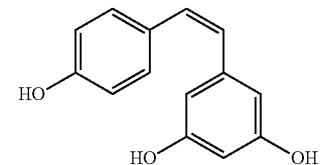

Cis-form (3,5,4'-trihydroxy-cis-stilbene)

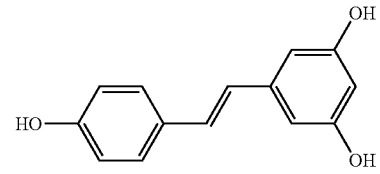

Trans-form (3,5,4'-trihydroxy-trans-stilbene)

A container according to the present invention surprisingly assists in maintaining and even improving the quality and/or longevity of the liquids. For example, the anti-ageing effect (browning) on the wine and in parallel stimulates the natural immune system of the wine in a container and as a result remarkably extends shelf life, e.g. up to and beyond two years.

According to one embodiment, 5-10% maturation cycle of the wine occur in the filled can, and essentially in this time reactions within the wine occur continually. Surprisingly we found that using resveratrol as a component of the coating system inside the container, not only afforded protection for the wine from the container material but it enhances the beneficial effects of resveratrol in the wine. Further, resveratrol present in the wine can enhance its beneficial effects by being absorbed as a component of the coating system.

In the context of packaging of a hard to hold and aggressive liquid, such as wine, there is the risk that the liquid interacts and reacts with the packaging material which might lead to an impact on the taste, appearance or overall integrity of the liquid. This interaction is largely caused by acid or free radicals initially present in the liquid or produced over time.

Accordingly, the present invention is not limited to wine or wine-based drinks as the liquids but is also useful for the packaging of any liquid or beverage which may interact or react with the packaging material, leading to degradation and decomposition of the packaging material and ultimately to spoilage of the liquid. Examples of such liquids are fruit juices, in particular grape juice, soft drinks, lemonades, colas, acidic beverage, carbonated beverages and beverages containing phosphoric acid. Additionally, the present packaging material also finds use for non-beverage liquids that react with conventional packaging materials.

In a preferred embodiment of the present invention, wine or a wine-based drink are used as the liquid. Due to the immanent characteristics of wine as a relatively aggressive and hard-to-hold beverage, the packaging of wine or a wine-based drink according to the present invention yields the most excellent effects.

A problem of spoilage of the liquid by the packaging material arises if the liquid reacts with the inner coating of the container, making it important to prevent degradation and decomposition of the packaging material. It was surprisingly found by the inventors that resveratrol as part of the coating of the inner wall of a container is able to protect from and prevent this degradation and decomposition.

While not wishing to be bound by theory, it is assumed that according to one embodiment of the invention, resveratrol present in the coating of the container may function as a component active at the surface of the coating facing and in contact with the liquid, as well as in the coating (which may also act as a reservoir of resveratrol releasable over a prolonged time) and in the liquid upon migration from the coating into the liquid. Further, resveratrol present in the liquid itself may also enhance the advantage of the disclosed container by being absorbed by the coating that contact the liquid particularly wine.

It was observed that resveratrol may have additional desirable functions as part of the invention such as suppression of undesired fermentation in the container. Thus, e.g. excessive growth of yeast can lead to deterioration of taste, aroma and integrity of the wine. Furthermore, metabolites of yeast or other microorganisms can aggravate the problem of breakdown of the packaging material.

According to one embodiment, it was also found that when wine is in contact with a resveratrol enhanced coating it had a positive effect on maintaining or increasing the actual level of resveratrol in the wine. By creating such a barrier having the positive effects of resveratrol we have surprisingly found that it protects the wines' essential characteristics and enhances the key notes by maintaining the integrity of the resveratrol within the wine/wine products without compromising the stability and longevity of the product.

Figure 1:
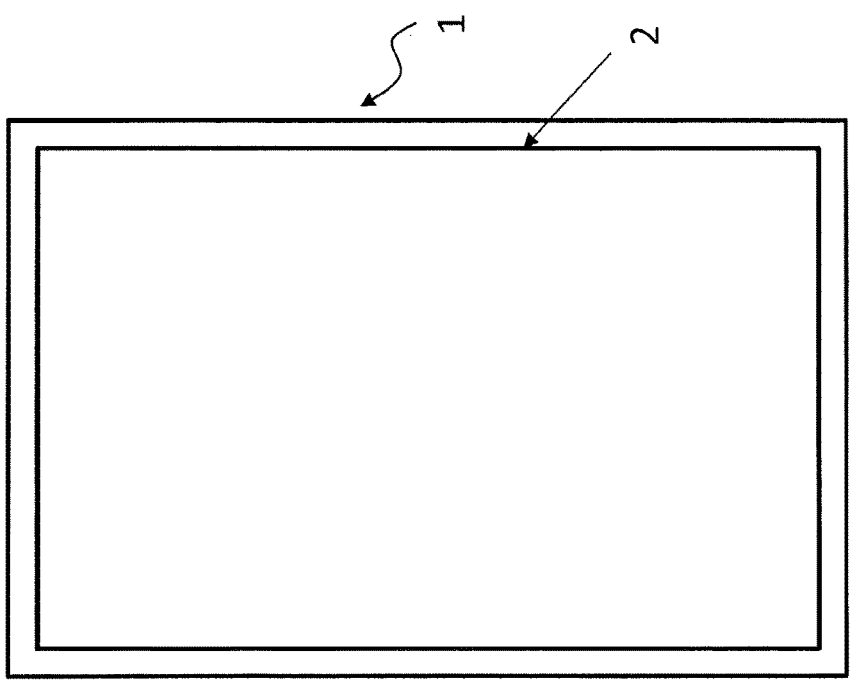
FIG. 1 is a first embodiment showing a container (1) for a liquid, such as wine or a wine-based drink and an inner surface (2) of the container.

According to one aspect of the present invention, it is advantageous that resveratrol is present in the coating of the container before the addition of a liquid, such as wine, to the container. According to this embodiment, the container of the invention refers to an empty container prior to filling with the liquid, in particular the wine or wine-containing drink. See FIG. 1. According to one embodiment, the container of the invention is an unused container, i.e. has never been used before for filling with a liquid, in particular the wine or wine-containing drink. This way a barrier having the protective functions as laid out above is provided along the inner wall of the container to fend off the aggressive, corrosive, acidic and oxidizing components of the liquid and to provide a protective surface of the coating form the very beginning, i.e. at the time of filling the container. According to one embodiment of this invention, this initial protection is particularly important to keep the coating layer intact from the first contact with the liquid but will also maintain the levels of resveratrol in the liquid to safeguard long-term quality and excellence of the liquid. This protection may be enhanced by adsorption by the coating layer of resveratrol that is present in the liquid present in the container.

In a preferred embodiment of the present invention, the coating layer comprises resveratrol in a concentration of at least 0.0001 weight %, preferably at least 0.001 weight %, more preferably at least 0.01 weight %, even more preferably at least 0.1 weight %, even more preferably at least 1 weight %, even more preferably at least 10 weight %, even more preferably at least 30 weight %.

In another preferred embodiment of the present invention, the coating layer comprises resveratrol in a concentration of at most 70 weight %, preferably at most 30 weight %, more preferably at most 10 weight %, even more preferably at most 1 weight %, even more preferably at most 0.1 weight %, even more preferably at most 0.01 weight %, even more preferably at most 0.001 weight %.

In a particularly preferred embodiment of the present invention, the coating layer according to the present invention comprises resveratrol in a concentration of from 0.0001 to 10 weight %, in one more preferred embodiment from 0.1 to 5 weight %, preferably 0.5 to 1 weight %, in another more preferred embodiment from 0.001 to 0.05 weight %, preferably 0.005 to 0.01 weight %. If resveratrol is present in the coating layer in the preferred amount, the resveratrol levels inside the liquid may be maintained or enhanced and an increased antioxidative effect occurs in the liquid.

According to one embodiment of the invention, the above weight-% ranges are based on the total weight of the coating layer comprising the resveratrol. If more than one coating layer is present in the container, according to one embodiment of the invention the above weight-% ranges are based on the total weight of all coating layers. According to another embodiment of the invention, the above weight-% ranges are based on the total weight of only the coating layer comprising the resveratrol.

According to one aspect of the present invention, the concentration of resveratrol may also differ through the cross-section of the coating layer. For example, according to one embodiment, the concentration of resveratrol at or close to the surface of the coating layer facing the liquid may be higher than in the parts of the coating further distanced from this surface. This way, the protective effect on the surface of the coating layer may be improved according to one embodiment of the invention, e.g. in unused containers before being filled with the liquid so that an advantageous protective layer is present when the liquid is filled into the container. According to another embodiments, the opposite concentration profile may be preset and may provide a longer lasting reservoir of resveratrol in the coating layer.

Figure 3:
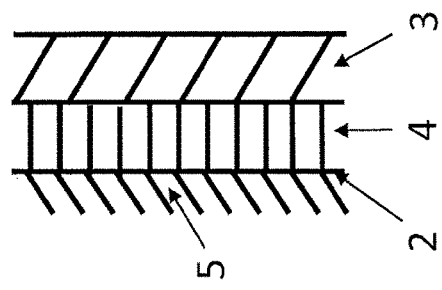
FIG. 3 shows a cut away view of another embodiment, wherein a portion of the container is the inner surface (2) coated with a resveratrol-containing layer (3) and an additional coating layer not containing resveratrol (4), wherein the coating layer not containing resveratrol (4) is secured to the inner surface (2) of the container.
Figure 5:
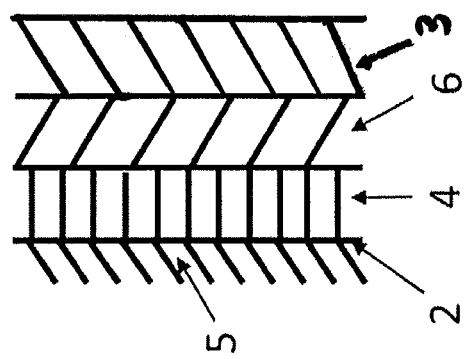
FIG. 5 shows a cut away view of another embodiment wherein three coating layers are applied against the inner surface (2) of the container (5). One of these layers is a coating layer containing resveratrol (3) and two of these layers are coating layers that do not contain resveratrol (4,6).
Figure 4:
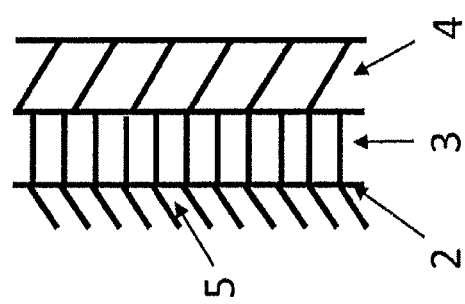
FIG. 4 shows a cut away view of another embodiment wherein a coating layer containing resveratrol (3) is coated against the inner surface (2) and an additional coating layer not containing resveratrol (4) is coated against the coating layer containing resveratrol.

According to another aspect one or more additional layers may be secured to the inner surface of the container that do not container resveratrol when applied. See FIGS. 3, 4, and 5. The relative position of resveratrol containing coating layer against the inner surface of the container may also be modified to suit the particular application.

The container according to the present invention provides producers of liquids such as winemakers around the world with a solution to the transport and storage of liquids such as wine globally without the use of refrigerated or temperature controlled storage and transport facilities which are currently a requirement when transporting wine globally under a variety of conditions impacting negatively on the integrity of wine or other liquids.

The invention is unique in that the container is transformed into an equilibrium that allows the transport of wine globally without the requirements of climate controls being applied during the storage and transport of wine and wine products in an aluminium container globally. The container according to the present invention achieves the requirements of retailers globally, for a product to be supplied that has a guaranteed shelf life of up to and greater than 12 months. This is an essential factor taking into consideration that the finished product could take up to 90 days from the time of manufacture to the actual time the product is available to the consumer.

The resveratrol-containing internal barrier and its application method may be part of an overall packaging system that has the capability to be applied to any liquid container during the normal container manufacturing process. The development of such a unique and novel integrated packaging system allows a total solution for container and can manufacturers and consumers alike to enjoy the product as it was filled.

Furthermore, the container according to the present invention can allow transporting the finished product in non-refrigerated sea-containers therefore minimising the carbon footprint.

In a preferred embodiment, the container is made of metal, polymer material such as a plastic material, paper, cardboard, glass or combinations thereof, in a more preferred embodiment of aluminium. The present invention is useful for the storage of any liquid, in particular those which is acidic, corrosive, oxidative or able to react in any way with the packaging material. The term "container" as used herein comprises any packaging or packaging material for liquids in rigid or flexible form. The containers may have any suitable form or shape for packaging the liquids. The container may be e.g. without limitation a can, bag, canister, tank, bowl, flask, cask or the like.

In a preferred embodiment of the present invention the coating layer acts as a two-way barrier. A two-way barrier should be understood in the context of the present invention to not only protect the liquid from undesired interaction with the packaging material leading to deterioration or change of color, aroma and taste of the liquid. In addition, this barrier should also protect the packaging material from undesired interaction with the liquid leading to pin holing, loss of product integrity and leaking.

Consumer assurance is reliant on factors such as the non 'tinny' taste (can taint) of liquids packaged in aluminium containers, shelf life stability and product integrity which need to be maintained by products packaged in aluminium containers. These consumer requirements have been met with the invention outlined herein.

One of the global benefits associated with this invention is a solution to the need to use refrigerated transport for wine to ensure the wines stability and integrity are maintained during transport and storage. A system using the container according to the present invention can remove the need for refrigerated container shipment and logistics reducing CFC's in the environment. The system can also allow the use of a closed loop recyclability application with e.g. aluminium containers for high value liquids (e.g. wine/wine products).

For example, only 5% of original energy used to create an aluminium can having a coating comprising resveratrol is required to recycle it. For every tonne of aluminium recycled, five tonnes of bauxite is conserved with the energy saved by recycling 1 tonne of aluminium cans equalling the amount of electricity used by a typical home in 10 years.

Furthermore, the present invention and its application address the problems of manufacturers using a thinner drawn can.

In principle, all coating compositions or lacquers known to the person skilled in the art can be used within the present invention for the coating layer(s). Examples for general methods for the preparation and application of exemplary layers are disclosed in EP 2457840 A1, "Packaging Materials 7. Metal Packaging for Foodstuffs" (Publication of the ILSI Europe Packaging Materials Task Force, September 2007, accessible at https://europa.eu/sinapse/sinapse/index.cfm?fuseaction=lib.attachment&lib_id=C5CO3DA0-ED72-0D54-309D55AA14F6C62F&attach=LIB_DOC_EN) or "Preliminary Industry Characterization: Metal Can Manufacturing—Surface Coating" (Publication of the U.S. Environmental Protection Agency, September 1998, accessible at http://www.epa.gov/ttnatw01/coat/mcan/pic-can-.pdf).

Lacquers which have previously been used for an inner coating (coating layer) of containers such as aluminium cans were predominantly based on Bisphenol A (BPA)-containing compounds such as epoxy resins. According to one embodiment of the present invention, the use of Bisphenol A or Bisphenol A-releasing substances in the coating layer of a container is avoided. According to one particular embodiment, the coating layer should not contain any of the following potentially hazardous substances: formalin, potassium permanganate (KMnO4), dibutyl phthalate (DBP), bis(2-ethylhexyl) ph thalate (DEHP), diisobutyl phthalate (DIBP), dimethyl phthalate (DMP), diethyl phthalate (DEP), bis(2-ethylhexyl) adipate (DEHA), diisodecyl phthalate (DIDP), diisononyl phthalate (DINP).

In another embodiment, the lacquer does not contain epoxy resins, in a further embodiment the coating layer does not contain bisphenol A or bisphenol A-releasing substances.

In another preferred embodiment, the various coating layers comprise a thermoset or thermoplastic coating layer.

In one preferred embodiment of the present invention, monomers that add flexibility to the lacquer may be added to the coating composition.

In one preferred embodiment, the composition of the coating layer according to the present invention meets all USFDA regulations or other national food safety regulations, in particular the coating is food grade. Such coatings are known to the skilled person and are available on the market. All available lacquers can be used within the present invention.

The thickness of the coating layer of the container according to the present invention should preferably be selected such that the highly aggressive elements in a liquid such as wine and wine based products do not come into contact with the container material which may lead to wine taint and package spoilage. If the thickness of the coating is appropriately selected, an extended shelf life and enhanced product integrity can be obtained.

In a preferred embodiment, the thickness of the coating layer on the inner surface of the container is in the range of between about 3.5 to about 8.4 grams per square meter, in a more preferred embodiment in the range of about 4.0 to about 8.0 grams per square meter, in a most preferred embodiment in the range of about 5.0 to about 8.0 grams per square meter.

In one preferred embodiment, the coating layer is consistently distributed throughout the entire inner wall of the container so that the inner wall is integrally coated with the layer containing resveratrol. See FIG. 6a.

In another preferred embodiment, the coating layer comprising resveratrol is a non-permeable layer, i.e. the coating layer comprising resveratrol is non-permeable for the liquid to prevent the interaction of the liquid with the packaging material.

According to one embodiment of the present invention, the wall of the container for a liquid may comprise one or more layers. If the wall of the container consists only of one layer, according to one embodiment of the present invention, this one layer, i.e. the wall of the container may comprise the resveratrol. In other words, the coating layer then is the wall of the container. One example of such an embodiment of the invention is a container made of a one-layer plastic foil sealed together to form a kind of bag for the liquid. The wall of the container, i.e. the one-layer coating then comprises the resveratrol and is at the same time the wall of the container.

According to a preferred embodiment of the invention, the layer comprising the resveratrol (e.g. the coating layer, or the wall of the container) is a layer comprising or consisting substantially or completely of polymers, preferably thermoset or thermoplastic polymers.

According to one preferred embodiment, all, substantially all or at least a part of the resveratrol comprised in the layer (e.g. the coating layer, or the wall of the container) is not covalently bound to a component of the layer, in particular a polymer present in the layer. The resveratrol not covalently bound may migrate and replenish resveratrol at the inner surface of the container or in the packaged liquid. On the other hand, bonding and fixing at least a part of the resveratrol to a component of the layer may in some instances help to keep the resveratrol at its preferred location, in particular in direct contact with the liquid.

In yet another preferred embodiment, the inner wall is partially coated with the coating layer containing resveratrol. See FIG. 6b. For example, the container may only be coated with the coating layer containing resveratrol in areas of the container where the coating is most prone to crack or fail. Alternatively, the inner wall may be coated with spots of coating layer containing resveratrol. These spots may provide enough resveratrol to obtain beneficial effects of the present invention. Areas that are not coated with the coating layer containing resveratrol according to this embodiment may be coated with a different coating layer to prevent the interaction of the liquid with the packaging material.

According to one further aspect, the present invention further provides a process for preparing a container for a liquid, in particular wine or a wine-based drink, comprising the steps of applying an uncured coating layer comprising resveratrol to a surface of a container wall material and curing the uncured coating layer.

The uncured coating layer can be applied to the container wall material e.g. by standard spray application guns as they are known in the art.

In one embodiment of the invention, the uncured coating layer comprising resveratrol is applied to the surface of a container wall material before the container is formed. The advantage of this embodiment is that the uncured coating layer comprising resveratrol may be applied and distributed more consistently on the surface of the container wall material before the material is formed into a hollow container. In another preferred embodiment, the coating layer comprising resveratrol may be attached or applied to a surface of the container wall material in the form of a film or a foil which is preferably laminated or otherwise bonded to the container wall material before or after forming the container. According to one embodiment of the invention, the coating layer(s) comprising resveratrol are prepared without extensive heating for prolonged times, e.g. by using foils. Also, if curing of the layer(s) is performed, other curing methods apart from heat curing may be used or the time and temperature of heating may be limited.

In another embodiment of the invention, the uncured coating layer comprising resveratrol is applied to the surface of a container wall material after the container is formed. The advantage of this embodiment is that standard containers for liquids may be obtained from mass producers and subsequently provided with the coating layer of the present invention to obtain a container having the advantages according to the present invention. Also, according to another embodiment, resveratrol may be added to the composition of a least one of the coating layers and the production process may otherwise remain unchanged.

In another embodiment, the resveratrol is added, e.g. sprayed on the surface of the coating layer after the coating layer has been applied to the inner wall of the container, but before the liquid is filled into the container. According to a further embodiment the resveratrol is added to the coating layer, e.g. sprayed thereon, after curing of the coating layer, but before the liquid is filled into the container. According to a further embodiment resveratrol is present in the liquid that is contained within the container. Such resveratrol may be adsorbed by the coating layer to enhance the performance of said coating layer.

In one preferred embodiment of the present invention, the process comprises the additional step of filling the container with a liquid, in particular a wine or a wine-based drink, preferably after the coating layer comprising resveratrol has been provided at the inner surface of the container.

The liquid, in particular wine or wine-based product to be filled in the container of the present invention should preferably meet the following parameters in order to achieve a long shelf life of the liquid filled in a can and optimal flavors of the liquid itself after storage.

Sterile canning of wine is preferably obtained by filling through sterilised equipment. All equipment, including the onsite wine storage tank downstream from the final membrane filter (lines, valves, filler etc) is preferably sterilised and operated in a sterile state.

Preferably the filling heads are sprayed with 70% ethanol prior to start up and repeated when filler downtime exceeds 10 minutes. Preferably a full sterilization is performed if the filler is subjected to down time longer than 4 hours.

Microfiltration of the wine is preferably used in the present invention to remove bacteria and yeasts from the wine prior to filling. Correct filter and filter housing preparation is a key protocol to successful wine in an aluminium container production. The inventors have found that for wine in an aluminium container poorly sanitised or prepared wine filters and filter housings will lead to microbiological complications within the wine in the container. According to one preferred embodiment, during storage, the sterile grade filters are preferably stored in a solution of about 0.5 wt.-% to 1.5 wt-% citric acid, in particular about 1% Citric Acid, preferably with the addition of about 20 to 100, in particular about 50 ppm Free $SO_2$. This is preferably made fresh and repeated on a fortnightly basis. Prior to filling the aluminium container, the filters are preferably sterilised and tested for integrity prior to use. The preferred sterilising time and temperature regime is 80° C. for 20 minutes.

Water can have a direct impact on the sensory profile and stability of wine in an aluminium container. This will occur if hoses and filters are not washed with quality filtered water. This will also occur if process equipment is not rinsed with clean quality filtered water.

Preferably, treated water for filter washing and filling machine washing in this invention:

Must meet all applicable local standards and guidelines.
Must meet the health-based guideline values of the World Health Organization (WHO).
Must meet all requirements that are product-specific as they relate to stability, shelf-life, and sensory profile of all wine in an aluminium container.

Chlorine may be used to sanitise equipment but it is preferably completely removed by rinsing with water prior to use of the equipment with wine.

Sulphur dioxide ($SO_2$) is an antioxidant that can be added to wine. Preferably, the addition of $SO_2$ in this invention is to inhibit the reaction of oxygen with the wine and to prevent damage to the wines integrity; colour, aroma and flavour compounds. In this invention, the functions of $SO_2$ for wine in aluminium containers may include the control of microbiological issues and minimise oxidation effects in the wine in an aluminium container. For wine at filling to have a Free $SO_2$ level of <35 ppm the wine ex winery is preferred to have a Free $SO_2$ level of 38-44 ppm, this final ppm level dependent on the distance from winery to the filling plant.

In this invention where the wines have less than 9% v/v alcohol, the antimicrobial agent sorbic acid is preferably added at a level greater than 75 mg/L, more preferably greater than 90 mg/L. This addition will assist in preventing microbial growth and spoilage of the product in storage and transport. In another embodiment a quantity of dimethyl decarbonate (DMDC) is added to the wine or wine-based beverage.

According to one embodiment of the present invention, the dissolved oxygen of the wine to be filled in the aluminium container may be minimised in wine in the tank prior to filling by sparging the wine with nitrogen gas. This system minimizes the negative influence of Dissolved Oxygen in the wine with the use of sparging with nitrogen gas prior to filling. It is a benefit of this embodiment that dissolved oxygen reduction for wine in an aluminium container achieves stability, extended shelf life and maintains the wines integrity under production, storage and transport. It was found that excessive sparging may result in damage to the wines integrity by reducing the flavour profile and imparting a bitter character presumably caused by dissolved nitrogen. Therefore, according to a preferred embodiment, the amount of nitrogen used for sparging is between 0.1 and 0.8 liter $N_2$ per liter of wine. This embodiment is also relevant in any filling process for a container, in particular an aluminium container, with a wine or a wine-based product, even in the absence of a coating layer containing resveratrol. However, it works particularly well in the presence of such a coating layer.

Carbon dioxide is naturally created during the wine fermentation process. During the maturation of the wine in storage most of the dissolved $CO_2$ has preferably been completely depleted or to acceptable levels of 'spritz' (400 ppm-800 ppm). Preferably all wine is cross flow filtered to ensure the dissolved $CO_2$ level of the wine is not the result of microbial infection.

According to one embodiment of the present invention that the preferred level of dissolved $CO_2$ may reduce the oxygen content of the wine and assist with protecting the wine from oxidation during the transport of bulk wine from the winery to the aluminium container filler. By preventing oxidation, minimal free $SO_2$ addition is required and minimum free $SO_2$ levels are maintained at the winery prior to dispatch.

The preferred level of dissolved $CO_2$ for wine is relevant as wine during transport is rarely refrigerated (eg. be it in ISO tankers—26,000 litres, Flexi tanks—24,000 litres or road tanker transport—various compartmentalized/litreage volumes), consequently the temperature of the wine increases and the potential for yeast activity enhanced. During this transit time the wine is also susceptible to oxidation by extended contact with air via faulty seals and closures.

Additionally the dissolved $CO_2$ may prevent further oxidation of the wine caused by the effects of ullage (namely the gap—air in the headspace) created in any one particular tanker compartment by either under filling, evaporation or leakage of the wine during transit.

The levels of the actual $CO_2$ in the wine and resultant effectiveness will diminish as the temperature of the wine increases (during transport). However, the initial level of dissolved $CO_2$ in the wine at the winery ensures that the wine will arrive at its destination in the same condition as when dispatched from the winery and with preferred final levels of dissolved $CO_2$ of 50 ppm-1200 ppm for still white wines and 50 ppm to 400 ppm for still red wines prior to can filling.

The combination of maximum dissolved oxygen and minimum dissolved carbon dioxide levels with microfiltration allows lower free $SO_2$ levels and inhibits wine spoilage as the potential for oxidation, microbiological spoilage and re-fermentation are far greater during wine transport and wine transfer than in storage at the winery. In addition, it is impossible to perform any corrective procedures during transit.

The preferred specific levels of dissolved $CO_2$ in wine are important in maintaining particularly well the wines varietal character. The preferred range of dissolved $CO_2$ for still red wine is 50 ppm to 400 ppm, more preferably 200 ppm to 400 ppm as higher levels will create a sharper more aggressive tannic tasting wine.

The preferred range of dissolved $CO_2$ for still white wines is 50 ppm to 1200 ppm (dependent on varietal character of the wine and the level of freshness and crispness required) and preferably is 400 ppm to 800 ppm. For sparkling wines the upper limit of dissolved $CO_2$ is greater but is not critical. In an alternative embodiment the level of dissolved $CO_2$ in the wine is limited to levels of 50 ppm-12,000 ppm.

Preferably the dissolved $CO_2$ level at the winery and after wine transfer to tanker is 0.8-1.2 g/L (800 ppm-1200 ppm). Preferably the dissolved $CO_2$ in storage tank at filling facility prior to canning is up to 1.2 g/L (1200 ppm). For still red wines this is preferably up to 0.4 g/L (400 ppm).

This preferred maximum level will prevent significant loss of shelf life due to minimising oxidation potential during bulk wine transport and the resultant oxidation of the packaged product during storage and transport. Furthermore, a wine to be filled in the aluminium container according to the present invention preferably has a pH of between 2.9 and 3.8.

After filling, the pressure within the aluminium container is preferably maintained at a pressure above 15 psi at 4° C., so that the corrosion resistant lining in the aluminium container is less likely to fracture or crack exposing fissures as a result of external container damage in storage and transport. In addition the walls of the container are less likely to be buckled which can also lead to damaging the internal lining which can then damage the integrity of the wine.

Yeasts are the most likely cause of microbial spoilage in packaged wine due to their tolerance of alcohol, low pH and anaerobic conditions. We have discovered that Yeast growth in wine in an aluminium container is inhibited by high volumes of carbon dioxide. Sparkling wine packed according to this invention contains high levels of carbon dioxide, preferably 3.3-3.8 volumes. Yeast growth in sparkling wine packaged using the protocols in this invention are extremely unlikely.

In a filled 250 ml container, the head space volume is preferably less than 3 ml, more preferably less than 2 ml and even more preferably about 1 ml.

In the context of the present invention, it should be understood that the inner surface (2) of the container (1) should mean the inner side of the container wall (5) facing the interior of the container. See FIGS. 1 and 2. Thus, the container according to the invention has a container wall, e.g. made of metal such as aluminium, and this container wall has an outer side facing the exterior of the container and an inner side facing the interior of the container. The inner side (or surface) of the container according to one embodiment of the invention thus may be coated with one or more layers, at least one of which comprises resveratrol (3). In one embodiment of the present invention, the inner surface (2) of the container (wall) is provided with only one layer (coating layer). See FIG. 2. This layer comprises resveratrol according to the present invention. In another embodiment of the present invention, the inner surface of the container (wall) is provided with more than one layer. In this case, one or more of the layers (3) may comprise resveratrol. See FIGS. 3, 4 and 5.

According to a broad aspect of the invention, the container for a liquid thus comprises a container wall comprised of one or more layers, wherein at least one layer comprises resveratrol.

According to one embodiment, one or more layers not comprising resveratrol may be present between the layer comprising resveratrol and the container wall. See FIGS. 3 and 5. Also, according to one embodiment, one or more layers not comprising resveratrol may be present between the (coating) layer comprising resveratrol and the exterior of the container for a liquid. See FIG. 4.

According to another embodiment, one or more layers not comprising resveratrol, when applied to the container may be present between the layer comprising resveratrol and the interior of the container, i.e. the cavity of the container in which the liquid may be filled. According a further embodiment, the layer comprising resveratrol is the layer directly facing the interior of the container, i.e. is in direct contact with the container cavity or the liquid, respectively, once the container has been filled with the liquid.

In one embodiment of the present invention, resveratrol may be contained in any of the layers located inside of the outer aluminium shell (container wall) of the can. In a preferred embodiment, resveratrol is contained only in one or more layers located inside of the outer aluminium shell of the can which are able to interact with the liquid (e.g. the wine), either directly or through an additional layer which is permeable for resveratrol and/or the liquid. In another preferred embodiment, resveratrol is contained in one layer which is able to interact with the liquid.

In another preferred embodiment, the uncured coating layer comprises free metal radicals. The addition of free metal radicals to the uncured lacquer will reduce the baking and curing temperature as well as the curing time, leading to an additional reduction of energy needed for the packaging of a liquid in a container according to the invention.

In one embodiment, the uncured coating layer is cured for 80 to 230 seconds at a temperature of from 180 to 250° C., more preferably at from 180 to 220° C.

According to the present invention, it is possible to apply a top coating layer comprising resveratrol to the inside of the liquid container so that the resveratrol-containing layer is in contact with the liquid.

In yet another preferred embodiment, at least one additional coating layer is present. For example, the bottom layer represents a resveratrol-infused, BPA-free, corrosion resistant coating layer comprising an, in particular water-based, monomer enhancer which drives the resveratrol to the top coating layer which is in contact with the liquid.

According to one embodiment of the invention, it is ensured that at the final stage of the preparation of the container (i.e. before filling), resveratrol is located on the inner surface in the coating layer of the container which is in contact with the liquid.

This invention also provides the use of a container as described herein for the storage of a liquid. In a preferred embodiment, the container is used for the storage of a liquid, such as wine or a wine-based drink.

This invention also provides use of a container for a liquid that contains resveratrol in particular a container for wine or a wine-based drink.

Furthermore, this invention provides the use of resveratrol as an additive to a coating layer, in particular a coating layer on the inner surface of a container for a liquid, in particular for a container for wine or a wine-based drink.

All embodiments of the present invention as described herein are deemed to be combinable in any combination, unless the skilled person considers such a combination to not make any technical sense.

EXAMPLES

Example 1: Preparation of Lacquers (Coating Layers) Containing Resveratrol

Bisphenol A-Free Polyester Acrylate Containing Layer (Prepared According to Example 2 of WO 2008036629 A2)

A 2-liter flask was equipped with a stirrer, packed column, condenser, thermocouple, heating mantle and nitrogen blanket. The following were added to the flask: 498.6 grams of propylene glycol, 80.1 grams of trimethylolpropane, 880.1 grams of terephthalic acid, 40.0 grams of isophthalic acid, and 2.0 grams of FASCAT 9100 butylhydroxyoxostannane catalyst (available from Total Petrochemicals USA, Inc., Houston, USA).

The flask contents were slowly heated to 225° C. to 235° C. under a nitrogen blanket, and the water from the resulting polycondensation reaction was distilled off. Once the reaction mixture became clear and the temperature at the head of the column dropped, the reaction mixture was cooled to 160° C., and 85.5 grams of isophthalic acid and 16.0 grams of maleic anhydride were added to the flask. The reaction mixture was slowly reheated under a nitrogen blanket to 220° C. to 230° C.

Once the reaction mixture became clear and the temperature at the head of the packed column dropped, the reaction mixture in the flask was cooled to 200° C., the packed column replaced with a Dean & Stark column for azeotropic distillation, and 30.0 grams of xylene were added to the flask. The contents of the flask were reheated under a nitrogen blanket to reflux temperature, and more reaction water was distilled off until the acid number of the reaction mixture fell below 5. The contents of the flask were cooled to 145° C. to 150° C., and 744.6 grams of butyl glycol, 104.7 grams of n-butanol, and 219.6 grams of xylene were then added to form a solution of dissolved Polyester.

A 5-liter flask was equipped with a stirrer, reflux condenser, thermocouple, heating mantle, and nitrogen blanket. A sample of the solution of dissolved Polyester prepared as described above (1782.0 grams) and butyl glycol (123.0 grams) were placed in the 5-liter flask and preheated under nitrogen blanket to 120° C. In a separate flask, 321.0 grams of ethyl acrylate, 68.3 grams of glacial acrylic acid, 96.1 grams of styrene and 11.9 grams of VAZO 67 free radical initiator (2,2'-azobis(2-methyl-butyronitrile, available from Du Pont de Nemours, Wilmington, Del., USA) were premixed. The mixture of monomers and initiator was then added to the polyester solution over a period of 135 minutes under a nitrogen blanket and at a temperature of 120° C.-122° C. The temperature in the 5-liter flask was then maintained for 1 hour at 122° C.

Following this, 2.6 grams of TRIGONOX C free radical initiator (tert-butyl peroxybenzoate, available from Akzo Nobel) were added to the 5-liter flask, and the reactor temperature was maintained for 2 hours at 122° C. The reaction mixture was then cooled to 105° C., and a premix containing 150.3 grams of dimethylethanolamine and 150.3 grams of demineralized water was added to the 5-liter flask over a 10-minute period, followed by a hold of 10 minutes. The reaction mixture dropped in temperature to 90° C. at the end of the addition. Finally, 2554 grams of water were added to the 5-liter flask over a 30-minute period, and the solution of the polyester acrylate inverted into an aqueous dispersion of the Polyester Acrylate.

A 60% solution of VARCUM 2227 phenolic resin (211 grams) (Reichhold Corporation, Durham, USA) was incorporated in the inverted polyester acrylate resin that was at a temperature of about 60° C. after the final water addition to the polyester acrylate resin had been completed. This VARCUM 2227 resin addition was followed by a hold of 20 minutes.

The aqueous dispersion of Polyester Acrylate Phenolic contained 29.8 wt-% solids (nonvolatile matter), based on the total weight of the aqueous dispersion of Polyester Acrylate Phenolic, as determined by heating a 1-gram sample of the aqueous dispersion of Polyester Acrylate Phenolic for 60 minutes at a temperature of 150° C. The aqueous dispersion of the Polyester Acrylate Phenolic had a pH of 8.53 standard pH units at a temperature of about 20° C.

To 70.43 parts of polyester acrylic phenolic resin as prepared above under stirring were added 14.40 parts deionized water and a premix consisting of 0.022 part CYCAT 600 aromatic sulphonic acid, 10.75 parts w-butanol, and 2.57 part CYMEL 303 hexamethoxymethylmelamine. To the resulting composition under stirring was added 0.17 parts Carnauba Wax emulsion and 0.65 part BACOTE 20 AZC (MEL Chemicals, Manchester, UK; diluted 10% in water). The resulting product is suitable for spray application on the interior and cans and crosslinks at high temperature.

In the following Examples, however, Valspar 40Q60AA (available from The Valspar Corporation, Minneapolis, USA) was used as the Bisphenol A-free Polyester Acrylate containing layer (Lining A). To illustrate the effect of the present invention, the Bisphenol A-free Polyester Acrylate containing layer was prepared without the addition of Resveratrol, or with the addition of 0.001 wt %, 0.01 wt % and 0.1 wt % directly to the solution suitable for spray application.

Epoxy-Acrylate containing layer (prepared according to Example 18 of WO 2008036629 A2)

A 5-liter flask was equipped with a stirrer, reflux condenser, thermocouple, heating mantle, and nitrogen blanket. Low molecular weight liquid epoxy and bisphenol A were charged to the reactor plus butyl tri-phenyl phosphonium bromide catalyst and xylene. A Nitrogen purge was carried out and heat was applied initially, after which an exotherm raised the temperature in the reactor.

A target weight per epoxy value of around 2900-3100 was achieved in a typical reaction time of 6 hours. Butyl glycol, n-butanol, and amyl alcohol solvents were then added slowly over a 90-minute period. Acrylic monomers styrene, and methacrylic acid plus benzoyl peroxide initiator LUCIDOL 78 (available from Akzo Nobel, Amsterdam, The Netherlands) were then added to a monomer addition tank. After stirring, the acid number of this monomers/catalyst pre-mix was checked. The monomers/catalyst were then slowly added to the hot epoxy solution and the acrylic polymerization took place. The epoxy acrylic resin solution was then cooled and discharged from the reactor into a thinning tank containing a solution of water and diaminoethanolamine. The epoxy acrylic solution formed a dispersion in the water by inversion.

To 76.02 parts epoxy acrylic resin dispersion as prepared above was added with stirring, 18.82 parts deionized water, 3.68 parts w-butanol, and a premix consisting of 0.25 parts dimethylaminoethanol and 1.23 parts deionized water. The resulting product was suitable for spray application on the interior of cans and crosslinked at high temperature.

In the following Examples, however, Aqualure 900 (available from Akzo Nobel, Amsterdam, The Netherlands) was used as the Epoxy-Acrylate containing layer (Lining B). To illustrate the effect of the present invention, the Epoxy-Acrylate containing layer was prepared without the addition of Resveratrol, or with the addition of 0.001 wt %, 0.01 wt % and 0.1 wt % directly to the solution suitable for spray application.

Example 2: Application of Resveratrol-Containing Coating Layer to Packaging Material/Container Wall (Before/after Forming of the Container)

The lacquers as described in Example 1 are applied to the aluminium can as a coating layer by using a twin gun to coat the internal wall and dome of the can. The amount of lacquer to be applied depends on the size of the can to be coated. In this Example, cans with a volume of 150 to 440 ml have been coated using 100 to 240 mg of Lining A or Lining B containing 0.01 wt % resveratrol.

The uncured coating layer is cured for 80 to 230 seconds at a bake temperature between 180 and 250° C. The resulting distribution thickness of the layer lies between 3.5 and 8.4 grams per square meter (gsm). The thickness of the film layer is indicated for the top, middle, bottom and dome section of a can coated with Lining A containing 0.01 wt % resveratrol in Table 1.

TABLE 1

| Can size - ml | Film weight - mg | Film distribution - gsm | | | |
|---|---|---|---|---|---|
| | | Top | Middle | Bottom | Dome |
| 150 | 100 | 6.0 | 6.9 | 6.9 | 6.5 |
| 200 | 120 | 5.2 | 5.5 | 5.5 | 5.0 |
| 250 | 170 | 7.0 | 7.6 | 7.3 | 6.6 |
| 300 | 180 | 6.0 | 6.2 | 6.1 | 6.0 |
| 330 | 200 | 6.5 | 6.0 | 6.0 | 5.7 |
| 375 | 215 | 6.0 | 6.8 | 7.3 | 6.9 |
| 440 | 230 | 6.2 | 6.9 | 6.3 | 6.0 |

Example 3: Assessment of Physical Parameters of Coated Cans

The cans obtained in Example 2 were examined for adhesion of the coating layer (AS 1580 Method 408.4), impact resistance at 18 Joule (AS 1580 Method 406.1), pinholing after incubation in HCl for 5 minutes (SSL test method). They were further examined microscopically for blistering (AS 1580 Method 481.1.9), delamination (AS 1580 Method 481.1.10) and corrosion (AS 1580 Method 481.3). The performance of the can in all tests was excellent and the integrity of the coating layer was maintained. Results of these tests are shown in Table 2.

TABLE 2

| Test | Test Method | Result |
|---|---|---|
| Adhesion Cross Cut | AS 1580 Method 408.4 Rating 0 = no removal of coating 5 = complete removal of coating | 0, 0, 0 Av = 0 |
| Impact Resistance Reverse Impact | AS 1580 Method 406.1 | No failure of coating at 18 Joule (1.8 kgf m) |
| Pinholing | SSL Test Method Can filled with HCl and allowed to stand for 5 minutes. Points of hydrogen evolution observed. | 0 pinholes/can |
| Microscopic examination | | |
| Blistering | AS 1580 Method 481.1.9 | Rating 0 (no blistering) |
| Delamination | AS 1580 Method 481.1.10 | Rating 0 (no delamination) |
| Corrosion | AS 1580 Method 481.3 | Rating 0 (no corrosion) |

Example 4: Organoleptic Assessment of Packaged Red Wine

Red wines were packaged in 250 ml slimline cans as obtained in Example 2 and then stored for 24 months. Organoleptic assessment was done initially, after 3 months, after 6 months, after 12 months and after 24 months. The results of this Example are shown in Table 3.

TABLE 3

| Coating (gsm) | Initial | 3 months | 6 months | 12 months | 24 months |
|---|---|---|---|---|---|
| 6.0 | Clean, fresh | Sustained full flavour, good nose | Sustained full, rich flavour, good nose, | Sustained full flavour, good nose | Intense berry colour and nose. Full clean taste | gsm = gram per square meter

Example 5: Organoleptic Assessment of Packaged White Wine

White wines were packaged in 250 ml slimline cans as obtained in Example 2 and then stored for 24 months. Organoleptic assessment was done initially, after 3 months, after 6 months, after 12 months and after 24 months. The results of this Example are shown in Table 4.

TABLE 4

| Coating (gsm) | Initial | 3 months | 6 months | 12 months | 24 months |
|---|---|---|---|---|---|
| 6.0 | Clean, fresh | Sustained crisp flavour and straw colour. Good nose | Sustained crisp flavour and straw colour. Good nose | Bright citrus colour. Fruity and fresh | Intense berry colour and nose. Full clean taste |

Example 6: Organoleptic Assessment of Packaged Carbonated Red Wine

Carbonated red wines were packaged in 250 ml slimline cans as obtained in Example 2 and then stored for 24 months. Organoleptic assessment was done initially, after 3 months, after 6 months, after 12 months and after 24 months. The results of this Example are shown in Table 5.

TABLE 5

| Coating (gsm) | Initial | 3 months | 6 months | 12 months | 24 months |
| --- | --- | --- | --- | --- | --- |
| 6.0 | Clean, fresh Good bubbles/ Mousse | Sustained fresh flavour, vibrant colour and bubbles/Mousse | Sustained fresh flavour, vibrant colour and bubble/Mousse | Sustained fresh flavour, vibrant colour and bubble/Mousse | Crisp clean with sustained bubbles. Aromatic nose |

Example 7: Organoleptic Assessment of Packaged Carbonated White Wine

Carbonated white wines were packaged in 250 ml slimline cans as obtained in Example 2 and then stored for 24 months. Organoleptic assessment was done initially, after 3 months, after 6 months, after 12 months and after 24 months. The results of this Example are shown in Table 6.

TABLE 6

| Coating (gsm) | Initial | 3 months | 6 months | 12 months | 24 months |
| --- | --- | --- | --- | --- | --- |
| 6.0 | Clean, fresh Good bubbles/ Mousse | Sustained fresh flavour, vibrant colour and bubbles/Mousse | Sustained fresh flavour, vibrant colour and bubble/Mousse | Sustained fresh flavour, vibrant colour and bubble/Mousse | Crisp clean with sustained bubbles. |

Example 8: Comparative Test of Cans Coated with Commercially Available Lacquers Against can According to the Present Invention Cans as obtained in Example 2 are tested against cans lined with commercially available lacquer. Standard cans with comparative lacquers were obtained from the market (Comparison Cans 1 and 2, respectively). All containers were filled with wine and stored for 24 months. Organoleptic assessment was done by a panel of 16 consumers initially, after 6 months, after 12 months, after 18 months and after 24 months. The results of this Example are shown in Table 7 (red wine), Table 8 (white wine) and Table 9 (rose wine).

TABLE 7

| Storage | Initial | 6 months | 12 months | 18 months | 24 months |
| --- | --- | --- | --- | --- | --- |
| Inventive can with red wine | Fresh full taste | Fresh full taste | Fresh full taste | Fresh full taste | Fresh full taste |
| Comparison Can 1 with red wine | Fresh full taste | Flat | Foreign taste | Poor taste | Dull chemical taste |
| Comparison Can 2 with red wine | Fresh full taste | Low in fruit flavour | Dull | Chemical foreign taste | Flat |

TABLE 8

| Storage | Initial | 6 months | 12 months | 18 months | 24 months |
|---|---|---|---|---|---|
| Inventive can with white wine | Fresh full taste | Fresh full taste | Fresh full taste | Fresh full taste | Fresh full developed characters |
| Comparison Can 1 with white wine | Fresh full taste | Can corrosion | High aluminium/ can corrosion | Can corrosion, poor taste | Flat oxidised characters |
| Comparison Can 2 with white wine | Fresh full taste | Low in fruit flavour | Dull | Chemical foreign taste | Flat |

TABLE 9

| Storage | Initial | 6 months | 12 months | 18 months | 24 months |
|---|---|---|---|---|---|
| Inventive can with rose wine | Fresh full taste | Fresh full taste | Fresh full taste | Fresh full taste | Fresh full taste |
| Comparison Can 1 with rose wine | Fresh full taste | Can corrosion | High aluminium/ can corrosion | Can corrosion, poor taste | Flat oxidised characters |
| Comparison Can 2 with rose wine | Fresh full taste | Low in fruit flavour | Dull | Chemical foreign taste | Flat |

Example 9: Comparative Test of Wine Cans Coated with Coating Layers Containing Resveratrol According to the Present Invention Against Comparative Cans Coated with Coating Layers without Resveratrol Red wines were packaged in 250 ml slimline cans being coated with Lining A or Lining B without or with 0.001 wt %, 0.01 wt % or 0.1 wt % resveratrol as obtained in Example 2 and then stored. Key notes of the wine were assessed by a panel of 16 consumers initially, after 6 months and after 24 months, and resveratrol levels in the wine were determined according to "Method to determine resveratrol and pterostilbene in grape berries and wines using high-performance liquid chromatography and highly sensitive fluorimetric detection", Pezet et al., Journal of Chromatography A, Volume 663, Issue 2, 11 Mar. 1994, Pages 191-197 initially and after 6 months. Results are shown in Table 10.

TABLE 10

|  | RESULT 1 | RESULT 2 | RESULT 3 | RESULT 4 | RESULT 5 | RESULT 6 | RESULT 7 |
|---|---|---|---|---|---|---|---|
| LINING |  |  |  |  |  |  |  |
| Lining A w/o Resveratrol | X |  |  |  |  |  |  |
| Lining A 0.001 wt % Resveratrol |  | X |  |  |  | X | X |
| Lining A 0.01 wt % Resveratrol |  | X | X | X | X | X | X |
| Lining A 0.1 wt % Resveratrol |  | X | X | X | X | X | X |
| Lining B w/o Resveratrol | X |  |  |  |  |  |  |
| Lining B 0.001 wt % Resveratrol |  | X |  |  |  | X | X |
| Lining B 0.01 wt % Resveratrol |  | X | X | X | X | X | X |
| Lining B 0.1 wt % Resveratrol |  | X | X | X | X | X | X |
| Summary of Results |  |  |  |  |  |  |  |
| 1 | Diminished key notes after 6 months. |
| 2 | Maintained key notes e.g wine profile after 6 months |
| 3 | Improved key notes e.g nose fresh clean after 6 months |
| 4 | Improved key notes e.g colour/bright, intense after 6 months |
| 5 | Improved key notes e.g taste/fresh fruity after 6 months |
| 6 | Original resveratrol level of wine maintained or enhanced after 6 months |
| 7 | Increased shelf life e.g. more than 24 months |
| Lining Food Grade |  |
| Lining A | Bisphenol A-free Polyester Acrylate; Valspar ® 40Q60AA (Valspar Corp.) |
| Lining B | Bisphenol A Epoxy-Acrylate; Aqualure ® 900 (AkzoNobel Packaging Coatings) |

The invention claimed is:

1. A process for preparing a container for a liquid, wherein the container includes a container wall with an inner surface and an outer surface, comprising
applying a coating layer comprising a polymeric coating and an additive comprising monomeric resveratrol to the inner surface or an inner surface coating layer of the container wall, wherein the polymeric coating comprises a lacquer.

2. The process of claim 1, wherein the coating layer comprises multiple layers of coating, each with a different composition.

3. The process of claim 1 further comprising adding the liquid to the container after application of the coating layer to the container, wherein the liquid naturally contains resveratrol or comprises a liquid to which resveratrol has been added prior to introduction into the container.

4. The process of claim 3, wherein resveratrol present in the liquid is absorbed by the coating layer after the liquid has been introduced into the container.

5. The process of claim 1, wherein a composition of the container is selected from a group consisting of metal, a polymeric material, paper, cardboard, glass and a combination thereof.

6. The process of claim 1, further comprising sterilizing the container prior to applying the coating layer to the container.

7. A process for filling a container wherein the container includes a container wall with an inner surface and an outer surface comprising
applying a coating layer comprising a polymeric coating and an additive comprising monomeric resveratrol to the inner surface of the container wall or to an inner surface coating layer of the container wall, and
filling the container with a liquid.

8. The process of claim 7, wherein the liquid comprises wine.

9. The process of claim 8 further comprising adding $SO_2$ to the wine.

10. The process of claim 8 further comprising adding sorbic acid to the wine.

11. The process of claim 8 further comprising sparging the container prior to filling the container with the wine.

12. The process of claim 8, wherein a quantity of $CO_2$ present in the wine is limited to 50 ppm to about 12,000 ppm.

13. The process of claim 8, wherein pressure within the aluminum container is maintained above 15 psi at 4° C. after filling.

14. The process of claim 8, wherein a headspace volume is less than 3 ml in a filled 250 ml container.

15. The process of claim 8 further comprising applying a coating layer not comprising monomeric resveratrol to the container wall prior to filling the container.

16. The process of claim 15 wherein the coating layer comprising monomeric resveratrol is in contact with the wine.

17. The process of claim 8 wherein the coating layer further comprises free metal radicals.

18. The process of claim 8, further comprising applying an uncured coating to the inner surface of the container and curing the uncured coating onto the inner surface of the aluminum container.

19. The process of claim 8 further comprising adding dimethyl decarbonate (DMDC) to the wine.

20. The process of claim 7 further comprising microfiltering the liquid prior to filling the container with the liquid.

* * * * *